(12) United States Patent
Haustein et al.

(10) Patent No.: US 9,400,605 B2
(45) Date of Patent: Jul. 26, 2016

(54) EFFICIENT MANAGEMENT OF A VIRTUAL TAPE LIBRARY CLUSTER

(75) Inventors: Nils Haustein, Mainz (DE); Thorsten Krause, Kisslegg (DE); Ulf Troppens, Mainz (DE); Daniel James Winarski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 447 days.

(21) Appl. No.: 13/346,566

(22) Filed: Jan. 9, 2012

(65) Prior Publication Data

US 2012/0180066 A1 Jul. 12, 2012

(30) Foreign Application Priority Data

Jan. 12, 2011 (EP) .................................. 11150684

(51) Int. Cl.
| | |
|---|---|
| *G06F 9/46* | (2006.01) |
| *G06F 9/455* | (2006.01) |
| *G06F 12/00* | (2006.01) |
| *G06F 3/06* | (2006.01) |
| *G06F 11/14* | (2006.01) |
| *G06F 11/20* | (2006.01) |
| *G06F 11/34* | (2006.01) |
| *G06F 9/50* | (2006.01) |

(52) U.S. Cl.
CPC .............. *G06F 3/061* (2013.01); *G06F 3/0614* (2013.01); *G06F 3/0631* (2013.01); *G06F 3/0686* (2013.01); *G06F 11/1456* (2013.01); *G06F 11/201* (2013.01); *G06F 11/2089* (2013.01); *G06F 11/3433* (2013.01); *G06F 3/0664* (2013.01); *G06F 9/505* (2013.01); *G06F 2201/815* (2013.01); *G06F 2206/1012* (2013.01)

(58) Field of Classification Search
None
See application file for complete search history.

(56) References Cited

U.S. PATENT DOCUMENTS

| | | | | |
|---|---|---|---|---|
| 6,983,351 | B2 * | 1/2006 | Gibble et al. ................. | 711/159 |
| 7,162,604 | B1 * | 1/2007 | Nourmohamadian et al. ............................ | 711/168 |
| 7,263,574 | B2 * | 8/2007 | Matsuda et al. .................. | 711/4 |
| 7,308,528 | B2 * | 12/2007 | Kitamura et al. ............. | 711/111 |
| 7,743,198 | B2 | 6/2010 | Haustein et al. | |
| 7,886,299 | B2 * | 2/2011 | Kitamura ...................... | 718/104 |
| 2009/0006733 | A1 * | 1/2009 | Gold et al. ..................... | 711/111 |
| 2009/0063748 | A1 * | 3/2009 | Bello et al. ......................... | 711/4 |
| 2009/0063765 | A1 * | 3/2009 | Kottomtharayil et al. ..... | 711/112 |
| 2009/0064159 | A1 * | 3/2009 | LaFrese et al. ............. | 718/104 |
| 2009/0282203 | A1 * | 11/2009 | Haustein et al. .............. | 711/162 |
| 2009/0320041 | A1 * | 12/2009 | Noguchi et al. .............. | 718/105 |
| 2012/0117028 | A1 * | 5/2012 | Gold et al. .................... | 707/640 |

* cited by examiner

*Primary Examiner* — Tammy Lee
(74) *Attorney, Agent, or Firm* — Griffiths & Seaton PLLC

(57) ABSTRACT

Various embodiments for managing a virtual tape library cluster are provided. A virtual tape library system is enhanced by representing virtual tape resources in cluster nodes with a unique serial number. A least utilized cluster node is determined. One of the virtual tape resources represented within the least utilized cluster node is selected.

18 Claims, 6 Drawing Sheets

EFFICIENT MANAGEMENT OF A VIRTUAL TAPE LIBRARY CLUSTER

PRIORITY CLAIM

This application claims priority to European Patent Application No. 11150684.6, filed Jan. 12, 2011, which is hereby incorporated by reference in its entirety.

BACKGROUND OF THE INVENTION

1. Field of the Invention

The present invention relates to computers, and more specifically, to a virtual tape library cluster.

2. Description of Background

A virtual tape library (VTL) is a data storage virtualization technology used typically for backup and recovery purposes. A VTL presents a storage component (usually hard disk storage) as tape libraries or tape drives for use with existing backup software.

Virtualizing the disk storage as tape allows integration of VTLs with existing backup software and existing backup and recovery processes and policies. The benefits of such virtualization include storage consolidation and faster data restore processes.

A virtual tape library cluster is a group of linked computers, including a processor device, working together closely thus in many respects forming a single computer. The components of a cluster are commonly, but not always, connected to each other through fast local area networks. Clusters are usually deployed to improve performance and availability over that of a single computer, while typically being much more cost-effective than single computers of comparable speed or availability.

According to the prior art backup architecture 100 depicted in FIG. 1A, a backup server 102 has a backup application 104 that uses tape drives 122, 124, 126, 128 to read/write data from/to tape cartridges.

The tape drives are typically connected to the backup server through a storage area network, which may include one or more SAN-Switches 120. The connection to the SAN is provided via Host Bus Adapters (HBAs) 116, 118. To make the tape drives usable for the backup application, a tape device driver 114 creates tape drive paths 106, 108, 110, 112 which provide access to tape drives 122, 124, 126, 128 for backup application 104. The tape device driver 114 coordinates all I/O commands to the tape drives. Each tape drive path uniquely points to one tape drive. A tape drive might be either a physical tape drive or be a virtual tape drive emulated within a virtual tape library.

In a prior art backup architecture there can exist a plurality of physical connections between a backup server 102 and the SAN-Switches 120 as well as a multiple of physical connections between tape drives and a SAN-Switch. Upon these physical connections, logical paths may be defined via SAN-zoning. One SAN-Zone may for example consist of HBA 116 and tape drive 122. Therefore tape drive path 106 may be the logical path from HBA 116 and tape drive 122.

There can be multiple paths defined from a backup server 102 to a tape drive 122. One path may be from HBA 116 to drive 122 and another may be from HBA 118 to drive 122.

Multiple paths to a tape drive are used for enabling path failover. With path failover enabled, the tape device driver 114 recognizes that a tape drive is reachable via multiple paths. Therefore one primary and multiple alternate paths are defined for one tape drive within the tape device driver. If the primary path is lost, the tape device driver will switch over to an alternating path.

The tape device driver is also capable of monitoring the load on the HBAs and will perform load-balancing. This means if backup application 104 starts jobs on both tape drive paths 106 and 108, the device driver will check which HBA has less load and process the job via this HBA (if a logical path is known via this HBA).

As stated above, a backup application is typically aware of tape drives in form of tape drive paths 106, 108, 110 and 112. When a backup application wants to write or read to/from a tape, it uses a free tape drive path and requests to mount the cartridge into that drive. The tape device driver then effectively forwards the requests to that tape drive. If the tape device driver has load-balancing capabilities and has access to a tape drive via different paths, the device driver uses the more efficient path.

Prior art architecture 100 works fine for physical tape drives, but for a clustered virtual tape library like shown in architecture FIG. 1B there are some significant shortcomings. A clustered virtual tape library 201 comprises a virtual library system 220 representing virtual tape resources 222, 224, 226, 228 on more than one cluster nodes 202, 204. The cluster nodes represents a cluster of computing systems which perform the functions of a virtual tape library such as representing virtual tape resources in a cluster. Virtual library system 220 is accessible by all cluster nodes running the virtual tape library system. Each cluster-node has VLT-HBA's 210 and 212 for cluster-node 202; VTL-HBA's 214 and 216 for cluster-node 204. Each virtual tape resource is associated with one cluster node and can be accessed from the application 104 via the communication network represented by the server HBA's 116 and 118, SAN switch 120 and VTL-HBA's 210, 212, 214 and 216.

As stated above, each tape drive path is uniquely linked to a tape drive, for Example: 106 with 222, 108 with 224, 110 with 226, 112 with 228. The backup application chooses tape drive paths on a pre-defined algorithm. As the backup application is not aware, which virtual tape resources are on which cluster-nodes, the application may choose two tape drive paths by chance. In a good scenario, the application may choose tape drive path 106 and 110, which address virtual drive 222 on cluster nodes 202 and virtual drive 226 on cluster-node 204, which balances the load on the cluster nodes 202 and 204. In a worst case scenario, the backup application may choose tape drive paths 106 and 108, which address virtual drives 222 and 224 residing on the same cluster node 202. The result will be a high load on the cluster node 202, while cluster node 204 is running idle.

The shortcoming is, that the backup application is not aware, on which cluster node a certain virtual drive is configured within the VTL and which VTL-cluster node has actual the lowest load. This effectively may impact performance, because a load-balancing between the cluster nodes is not possible according to prior art. Thus a system and method is needed that performs load-balancing based on the utilization of the VTL cluster-nodes and VTL-HBA.

Another shortcoming is that there is no high-availability in such prior art solution. If, for example, a tape device path to a virtual tape drive fails then this virtual tape drive can no longer be used which causes an error to be reported to the application. Accordingly, a system and method is needed that provides high availability and automated failover to a different tape path if one tape path fails.

SUMMARY OF THE INVENTION

The present invention provides an improved virtual tape library cluster. The virtual tape library cluster includes at least two cluster nodes. Each cluster node includes at least one network adapter having a network communication to a tape device driver associated with server system running a tape storage application and a virtual tape library system coupled with said network adapters. The virtual tape library represents virtual tape resources and the tape storage application selects a virtual tape resource within one of said cluster nodes. The system is characterized by a virtual tape library system which is enhanced by a capability for representing each virtual tape resource in all cluster nodes with unique serial number, a load balancing component for determining the least utilized cluster node and selecting a virtual tape resource represented within said least cluster node.

In one embodiment of the present invention the virtual tape library system is coupled with the tape device driver which is enhanced by a means for recognizing one and the same virtual tape resource on all cluster nodes by using said unique serial number and means for selecting a virtual tape resource based on the response from said load-balancing component.

In a further embodiment, the means for recognizing sends a test command to one virtual tape resource which is represented in all cluster nodes and receives a responsive from said load-balancing component including a positive or negative return code for said virtual tape resource.

In a further embodiment a test command is sent when said tape device receives a mount request from the tape storage application.

In another further embodiment the means for selecting uses the virtual tape resource with the positive return code.

In a further embodiment the recognizing means receives a error message from the virtual tape resource and sends a test command to one virtual tape resource which is represented in all cluster nodes except of the failing virtual tape resource and receives a response from the load-balancing component including a positive or negative return code for the one virtual tape resource, and the tape device driver switches to the virtual tape resource with the positive return code.

The inventive system enhances a prior art architecture by methods and protocols to enable load-balancing within a clustered VTL-System.

The inventive system includes a novel VTL system which is capable to present each virtual drive on all VTL-HBAs and all cluster nodes. Thereby the serial number of one virtual drive instance is modified according to the VTL-HBA it is associated with. The novel VTL system also includes a load balancing module which is capable to determine which instance of virtual drive associated with a VTL-HBA and cluster node should be chosen for I/O based on the utilization of the VTL cluster-node. Additionally the VTL system allows the device driver to access all instances of a given virtual tape drive via the plurality of VTL-HBAs providing high availability.

The device driver will be enhanced to recognize that one and the same virtual tape resource is reported via all VTL-HBAs and all cluster nodes and. At the same time the enhanced device driver presents only one instance of each virtual drive to the application.

An inventive method for load-balancing is implemented in the novel VTL system and the enhanced device driver which is characterized by the following steps:
 1. the device driver obtains a mount request from the application which instructs the device driver to mount a certain virtual tape in a certain virtual drive
 2. the device driver first sends a test-unit-ready (TUR) command to each instance of said virtual drive
 3. responsive to this the load-balancing module of the VTL determines which VTL cluster-node is least utilized, selects a virtual drive virtualized by said least virtualized cluster-node and instructs the said virtual drive to return a positive response to the TUR command; all other instances of the virtual drive which received the TUR command are instructed to return a negative response for the TUR command
 4. the device driver receives the responses to the TUR command and determines the instance of the virtual drive which reported a positive response
 5. responsive to this the device driver instructs the selected instance of virtual drive to mount said virtual tape; and
 6. upon completion the device driver returns the completion message for the mount command to the application including the device handle.

A second inventive method for path failover is implemented in the novel VTL system and the enhanced device driver which is characterized by the following steps:
 1. The device driver issues SCSI commands to a previously selected instance of a virtual tape drive and the SCSI command reports a timeout;
 2. responsive to this the device driver determines another instance of the same virtual tape drive which is characterized by a different path;
 3. the device driver sends a test-unit-ready (TUR) command to the selected instance of the virtual tape drive;
 4. the load-balancing module of the VTL responds to this command via aforementioned selection; and
 5. responsive to this, if the TUR command was successful the device driver directs the failing and all subsequent commands to this instance of the virtual drive.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which.

Figure 1:
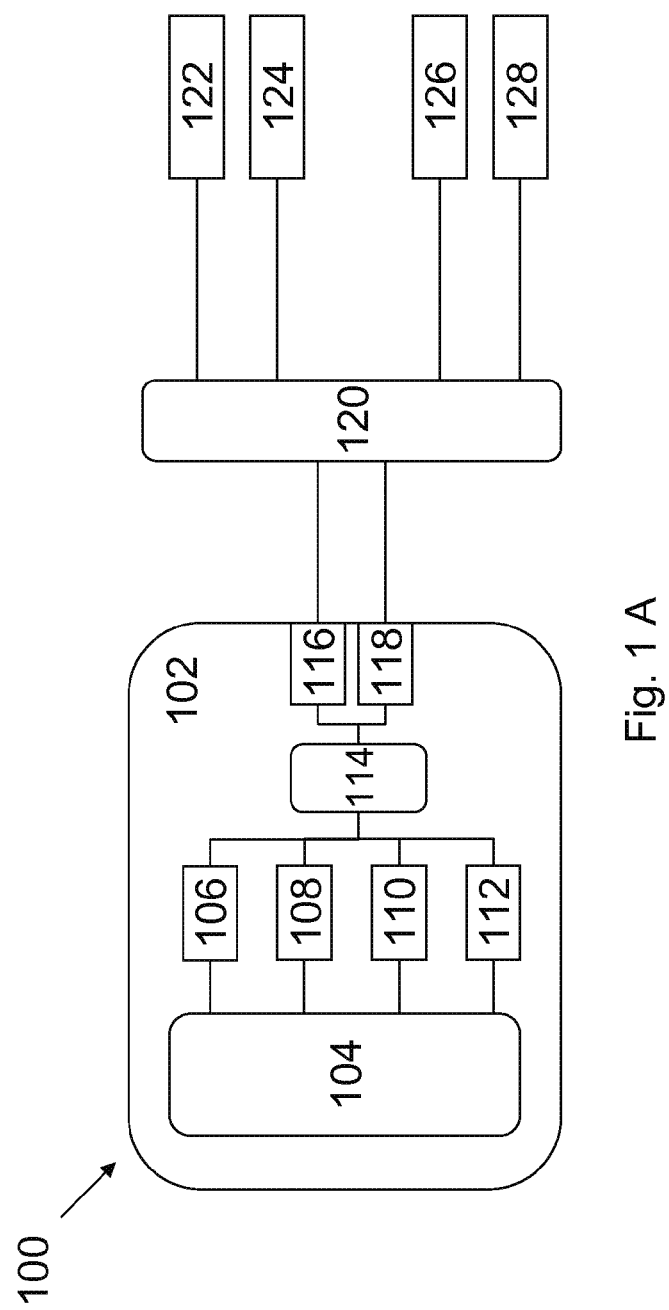
FIG. 1A shows a prior art backup architecture.
FIG. 1B shows a clustered tape virtual library architecture.
Figure 1:
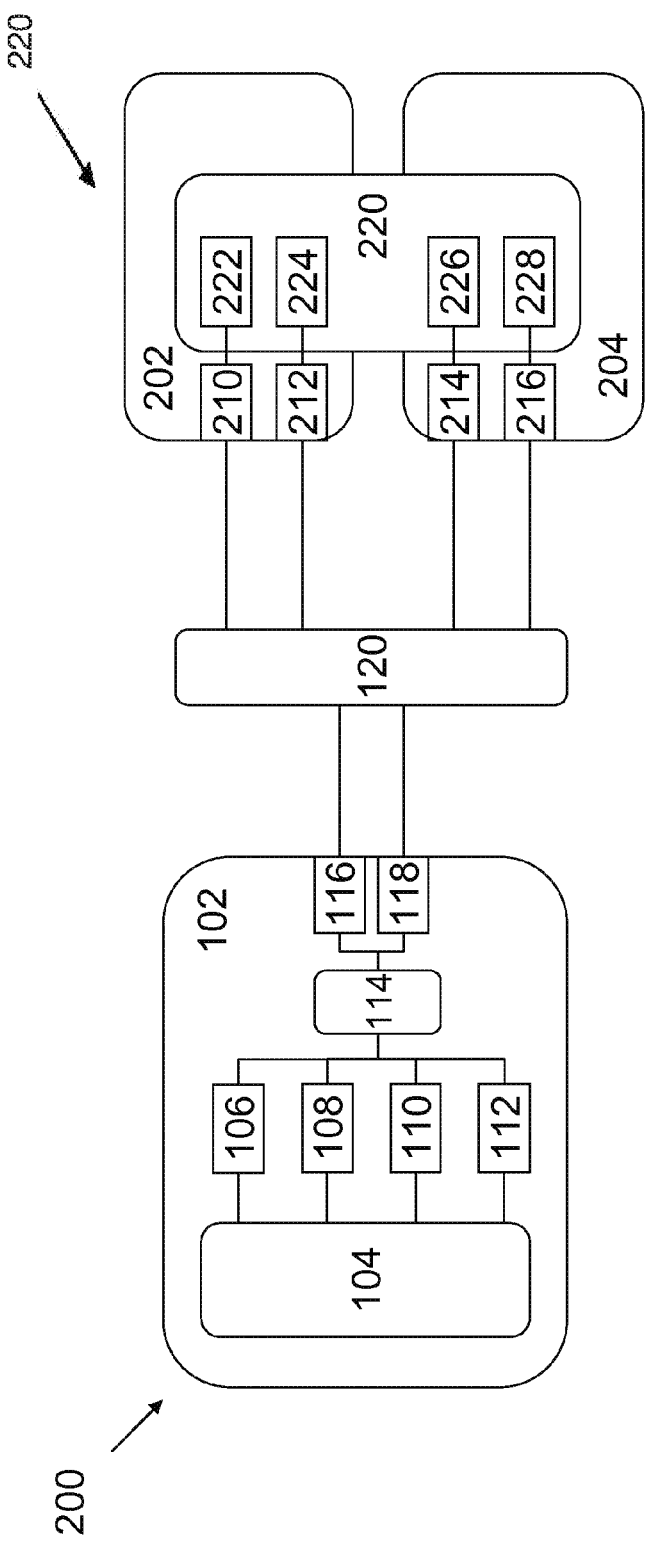

The detailed description explains the preferred embodiments of the invention, together with advantages and features, by way of example with reference to the drawings.

DETAILED DESCRIPTION OF THE INVENTION

FIG. 2A describes inventive backup architecture 300. The inventive backup architecture includes a novel clustered VTL 301 comprising a novel virtual tape library system 304 with a novel load-balancing module 306 and a novel device driver 302.

The novel virtual tape library system 304 represents virtual tape resources on all HBAs of all cluster nodes. According to FIG. 2A the virtual tape resource 310 is represented on cluster node 202 as virtual tape resource 310a on HBA 210 and 310b on HBA 212 and on cluster node 304 as virtual tape resource 310c on HBA 214 and 310d on HBA 216. Virtual tape resource 310a, 310b, 310c and 310d are thereby the same virtual tape resource with the difference that it is represented on different cluster nodes and different HBAs. Likewise the virtual tape resource 312 is represented on cluster node 204 as virtual tape resource 312a on HBA 214 and 312b on HBA 216 and on cluster node 302 as virtual tape resource 312c on HBA 210 and 312d on HBA 212. Virtual tape resource 310a, 310b, 310c and 310d are thereby the same virtual tape resource 310 with the difference that it is represented on different cluster nodes and different HBAs. Thus one and the same virtual tape resource is accessible from the application 104 via device driver 302 as four instances of the virtual tape resource.

The novel tape device driver 302 recognizes one and the same virtual tape resource 310 represented on multiple HBAs and clustered nodes as a multiple instances 310a, 310b, 310c and 310d. A virtual tape resource instance is one virtual tape resource represented on one HBA and cluster node. This recognition of virtual resource instances is based on a unique serial number schema for one and the same tape resources represented on multiple cluster nodes, which is implemented by the novel virtual tape system 304.

In the preferred embodiment the novel VTL-system 304 represents each virtual tape resource with a unique serial number and an additional instance-bit, indicating that the reported S/N is an instance of an S/N. This means, for example tape drive 310 with serial number 123456 will report following drives:

| Drive | Reported S/N | VTL-HBA |
|-------|--------------|---------|
| 310a  | 123456_1     | 210     |
| 310b  | 123456_2     | 212     |
| 310c  | 123456_3     | 214     |
| 310d  | 123456_4     | 216     |

When novel device driver 302 recognizes the drives and that the instance-bit has been set for a drive, it will first use the prior art path failover technology and create primary and alternate paths for each reported S/N, meaning there can be different paths for each reported S/N, for example S/N 123456_1 may have a primary path 116-120-210-310a and an alternate path 118-120-212-310b.

The novel device driver 302 will build only one tape drive path for all instances of a tape drive. The device driver will keep an internal instance mapping table mapping the tape drive path to S/N and to the drive instances S/N. This means, for example tape drive path 106 is only aware of drive with S/N 123456. Additionally the instance mapping table will keep an "Instance Status" showing which drive instances are currently enabled.

TABLE 2 instance mapping table

| Tape drive path | S/N | Drive instances S/N | Instance Status |
|-----------------|-----|---------------------|-----------------|
| /dev/IBM ® tape0 | 123456 | 123456_1 | Enabled |
|  |  | 123456_2 | Enabled |
|  |  | 123456_3 | Enabled |
|  |  | 123456_4 | Enabled |

Based on the recognition of multiple instances for one and the same virtual tape resource on multiple cluster nodes the enhanced device driver 302 is able to send commands to all instances. Commands are thereby sent via the tape path including VTL-HBAs (116 and 118), SAN switch 120 and VTL-HBAs (210, 212, 214 and 216).

Figure 2:
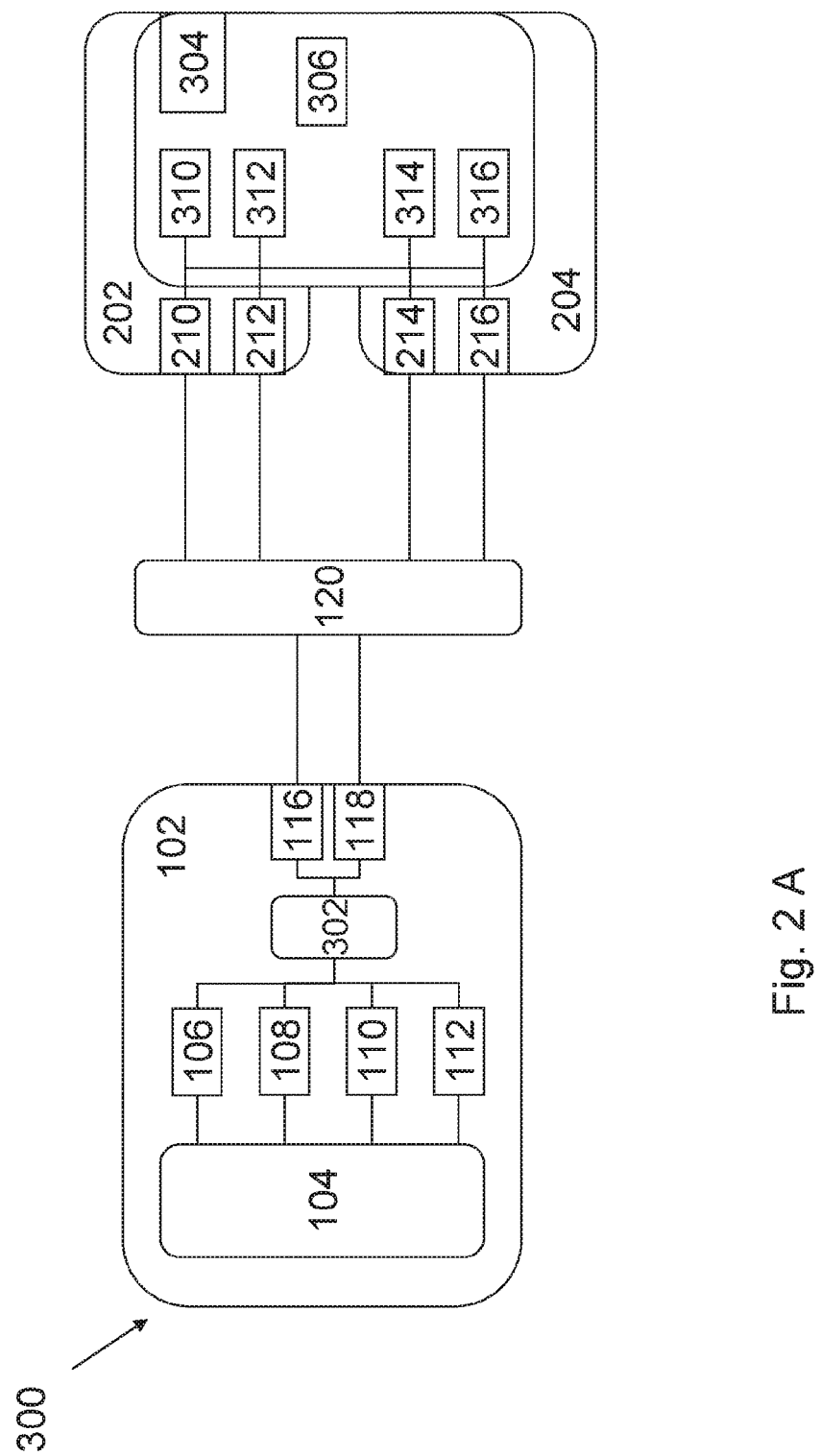
FIG. 2A shows the inventive virtual tape library architecture.
FIG. 2B shows the flow within FIG. 2A.
FIG. 2C shows the flow with failover processing.
Figure 2:
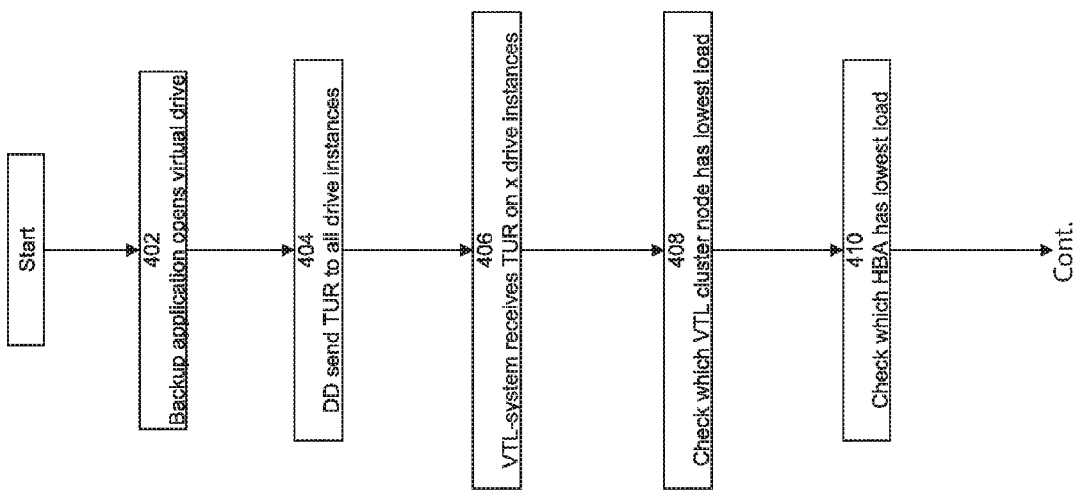
Figure 2:
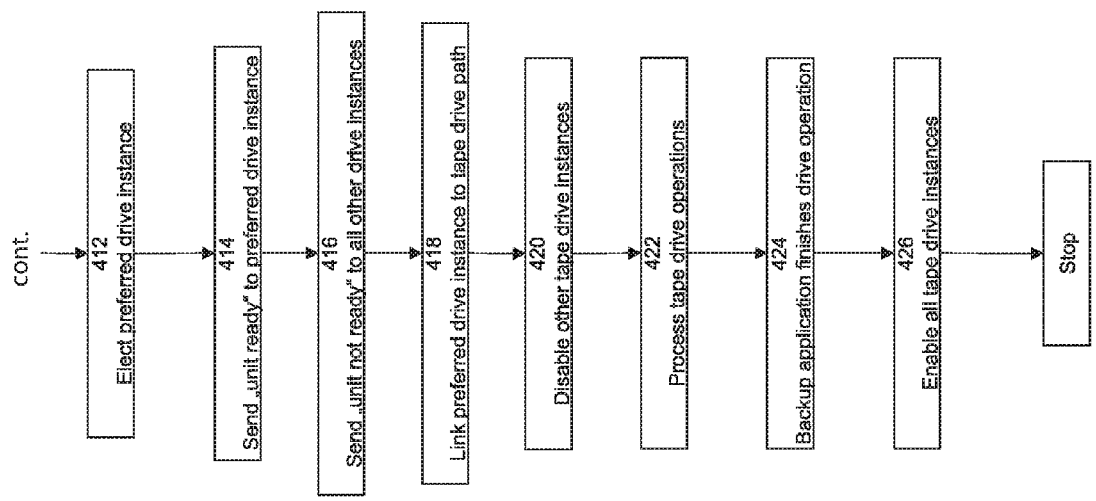
Figure 2:
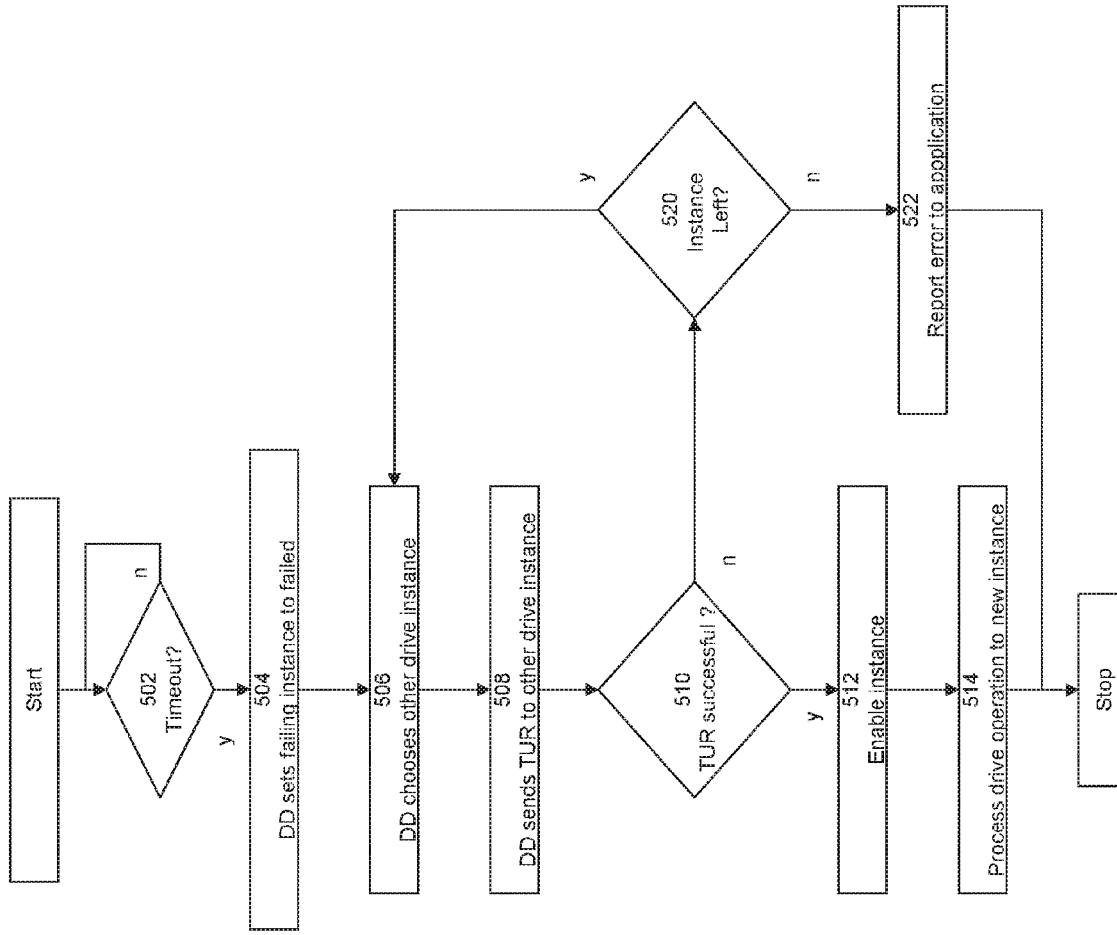

FIG. 2 B(½) describes the inventive process flow for typical drive operations. When the application 104 wants to use a virtual tape resource it send a request to the enhanced tape device driver 302 checks its internal instance mapping table and sends the test command to all virtual tape drive instances which are in status enabled (step 404). For example the enhanced tape device driver sends the test command to all instances of virtual tape resource 310, such as 310a, 310b, 310c and 310d (FIG. 2A). The request from the application to the device driver is typically a mount request passed on via the device driver API. The test command sent from the device driver is a test unit ready command (TUR) according to the SCSI specification.

The VTL system 304 receives the TUR command on each HBA for each instance of the virtual resource (step 406). Upon receipt of the TUR command, the VTL system 304 instructs the load-balancing module 306 to determine, which of the VTL cluster nodes (step 408) and which HBA (step 410) on that cluster node has the lowest utilization. This is done by prior art server and network monitoring. Upon determination of the HBA and cluster node with the lowest utilization (step 412), the VTL-system 304 will response with a "unit ready" status for the virtual resource instance which is connected to the selected HBA and cluster node being least utilized. For all other virtual tape resource instances the VTL system responds with a "unit not ready" status on all other drive instances (step 416). In general the VTL system 304 ensures that one virtual tape resources responds with a positive response such as "Unit Ready" while the status "Unit Not Ready" is interpreted as negative response and can be given for multiple instances of the virtual tape resource.

Upon receipt of the "unit ready" status for one virtual tape resource instance, the device driver maps the tape drive path for all further drive interaction directly to the selected drive instance (step 418) and disables temporary the other drive instance paths (step 420) in instance-mapping table 2. Then all further tape drive commands are directly sent to the active enabled virtual tape resource instance (step 422). When the application has finished its tape operations (step 424), it sends an un-mount command.

After processing the un-mount command successfully, the device driver enables again all drive instances to the tape drive path in instance-mapping table 2 and waits for the next mount command from the application (step 426). The inventive system described here may also be used to control incoming jobs from a VTL system point of view.

FIG. 2 C describes the failover processing with the capabilities of the inventive enhanced device driver. The tape device driver 302 checks if a timeout or failure occurred during a command execution by a virtual tape resource (310a) in step 502. If no timeout occurred, the process flows back to step 502 and continues checking for timeouts as shown in FIG. 2 C.

If a timeout occurred then the tape device driver sets the failed virtual resource instance (310a) to status "failed" (step 504) using the instance-mapping table 2. Then the device driver chooses the other virtual drive instances (310b, 310c and 310d) which are in status "disabled" in instance-mapping table 2 (step 506) and sends a TUR command to said chosen virtual tape resources instances (step 508). The TUR command is received by the virtual tape system 304 which instructs the load balancing module 306 in step 509 to determine, which of the VTL cluster nodes and which HBA on that cluster node has the lowest utilization. This is accomplished by prior art server and network monitoring. Upon a determination of the HBA and cluster node with the lowest utilization, the VTL-system 304 will respond with a "unit ready" status for the virtual resource instance which is connected to the selected HBA and cluster node being least utilized. For all other virtual tape resource instances the VTL system responds with a "unit not ready" status on all other drive instances. In general the VTL system 304 ensures that one virtual tape resources responds with a positive response such as "Unit Ready" while the status "Unit Not Ready" is interpreted as negative response and can be given for multiple instances of the virtual tape resource.

Upon receipt of the TUR command the tape device driver (step 510), the tape device driver determines the virtual tape resource instance which sent the response "Unit Ready" and enables the that virtual tape resource instance (step 512) and processes all drive operations further to said virtual tape resource instance (step 514). If the TUR wasn't successful in step 510, the device driver checks is any of the instances isn't set to failed (step 520). If there are instances left, the process flows back to step 506. If there are no instances left, the device driver reports an error to the application (step 522). In effect, process 500 provides the capability to implement a path failover between VTL-HBAs.

The inventive method for managing a virtual tape drive cluster can be implemented as an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The capabilities of the present invention can be implemented in software, firmware, hardware or some combination thereof. In particular, as will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for managing a virtual tape library cluster by a processor device in a computing environment, the method comprising:
   enhancing a virtual tape library cluster by representing virtual tape resources in cluster nodes with a unique serial number;
   determining a least utilized cluster node;
   selecting one of the virtual tape resources represented within the least utilized cluster node; and
   upon receiving an error message, sending a test command to one of the virtual tape resources represented in each of the cluster nodes except of the cluster node of a failing virtual tape resource.

2. The method of claim 1, further including recognizing the virtual tape resources on each of the cluster nodes by using the unique serial number.

3. The method of claim 2, further including, in conjunction with the recognizing, receiving a response from a load-balancing component, wherein the response includes at least one of a positive and a negative return code for the one of the virtual tape resources.

4. The method of claim 3, further including, in conjunction with the selecting one of the virtual tape resources, using the one of the virtual tape resources with the positive return code.

5. The method of claim 1, further including selecting one of the virtual tape resources based on a response from a load-balancing component.

6. The method of claim 1, wherein the test command is sent upon receiving a mount request from a tape storage application.

7. A system, including a processor device, for managing a virtual tape library cluster in a computing environment, comprising:
   at least two cluster nodes, wherein at least one network adapters having a network communication to a tape device driver associated with a server system running a tape storage application is included with each of the at least two cluster nodes,
   a virtual tape library system in communication with the at least two cluster nodes and coupled with the at least one network adapters and the tape device driver,
   a load balancing component in communication with the at least two cluster nodes and the virtual tape library; and
   at least one hardware processor connected to the at least two cluster nodes, the load balancing component, and the virtual tape library system operable in the computing environment, wherein the at least one processor device is adapted for:
      enhancing the virtual tape library cluster by representing virtual tape resources in the at least two cluster nodes with a unique serial number,
      determining a least utilized one of the at least two cluster nodes,
      selecting one of the virtual tape resources represented within the least utilized one of the at least two cluster nodes, and
      upon receiving an error message, sending a test command to one of the virtual tape resources represented in each of the cluster nodes except of the cluster node of a failing virtual tape resource.

8. The system of claim 7, wherein the hardware processor is further adapted for recognizing the virtual tape resources on each of the at least two cluster nodes by using the unique serial number, wherein the virtual tape library system coupled with the tape device driver is enhanced.

9. The system of claim 8, wherein the hardware processor is further adapted for, in conjunction with the recognizing, receiving a response from a load-balancing component, wherein the response includes at least one of a positive and a negative return code for the one of the virtual tape resources.

10. The system of claim 9, wherein the hardware processor is further adapted for, in conjunction with the selecting one of the virtual tape resources, using the one of the virtual tape resources with the positive return code.

11. The system of claim 7, wherein the hardware processor is further adapted for selecting one of the virtual tape resources based on a response from a load-balancing component, wherein the virtual tape library system coupled with the tape device driver is enhanced.

12. The system of claim 7, wherein the test command is sent upon receiving a mount request from the tape storage application.

13. A computer program product for managing a virtual tape library cluster in a computing environment by a processor device, the computer program product comprising a nontransitory computer-readable storage medium having computer-readable program code portions stored therein, the computer-readable program code portions comprising:
- a first executable portion for enhancing a virtual tape library cluster by representing virtual tape resources in cluster nodes with a unique serial number;
- a second executable portion determining a least utilized cluster node;
- a third executable portion selecting one of the virtual tape resources represented within the least utilized cluster node; and
- a fourth executable portion, upon receiving an error message, sending a test command to one of the virtual tape resources represented in each of the cluster nodes except of the cluster node of a failing virtual tape resource.

14. The computer program product of claim 13, further including a fifth executable portion for recognizing the virtual tape resources on each of the cluster nodes by using the unique serial number.

15. The computer program product of claim 14, further including a sixth executable portion for receiving a response from a load-balancing component, wherein the response includes at least one of a positive and a negative return code for the one of the virtual tape resources.

16. The computer program product of claim 15, further including a seventh executable portion for, in conjunction with the selecting one of the virtual tape resources, using the one of the virtual tape resources with the positive return code.

17. The computer program product of claim 13, further including a fifth executable portion for selecting one of the virtual tape resources based on a response from a load-balancing component.

18. The computer program product of claim 13, wherein the test command is sent when a tape device receives a mount request from a tape storage application.

* * * * *